(12) United States Patent  (10) Patent No.: US 6,474,658 B2
Hanai                      (45) Date of Patent: Nov. 5, 2002

(54) CHUCK FOR MACHINE TOOL

(75) Inventor: Teruo Hanai, Nagoya (JP)

(73) Assignee: Howa Machinery, Ltd., Aichi-Ken (JP)

( * ) Notice: Subject to any disclaimer, the term of this patent is extended or adjusted under 35 U.S.C. 154(b) by 71 days.

(21) Appl. No.: 09/776,815

(22) Filed: Feb. 5, 2001

(65) Prior Publication Data

US 2001/0011800 A1 Aug. 9, 2001

(30) Foreign Application Priority Data

Feb. 7, 2000 (JP) ........................................ 2000-028816

(51) Int. Cl.⁷ .............................................. B23B 31/18
(52) U.S. Cl. ...................................................... 279/106
(58) Field of Search ........................................ 279/106

(56) References Cited

U.S. PATENT DOCUMENTS 3,069,181 A * 12/1962 Hohwart et al. ............ 276/106
3,365,206 A *  1/1968 Hohwart et al. ............ 279/106
3,472,526 A * 10/1969 Hohwart ..................... 279/106
3,604,717 A *  9/1971 Hohwart ..................... 279/106
5,605,343 A *  2/1997 Barbieux .................... 279/106
6,036,197 A *  3/2000 Barbieux .................... 279/106
6,371,197 B2 *  4/2002 Weyer et al. ................ 279/106
6,371,493 B1 *  4/2002 Barbiex ...................... 279/106

FOREIGN PATENT DOCUMENTS

JP    3-96106    10/1991
JP    5-49207     6/1993
JP    5-309507   11/1993
JP    8-71819     3/1996
JP   11-70402     3/1999

* cited by examiner

Primary Examiner—Steven Wong
(74) Attorney, Agent, or Firm—Ladas & Parry

(57) ABSTRACT

Each of master jaws (17) has a middle spherical part guided for sliding movement by a spherical guide surface (16) formed in a chuck body (2), a round back end part (19) extended slidably through a spherical bearing member (12) supported on a support member (10) attached to a middle part of a driving member (5). Each master jaw (17) is provided with a through hole (26) extending between the front and the back end thereof and a sliding member (30) is inserted in the through hole of the master jaw (17) through the front end of the same so as to come into sliding contact with a stopper (36) attached to a chuck body (2). Therefore, the state of sliding contact between the sliding member (30) and the stopper (36) can be adjusted on the side of the front part of the chuck and work for adjusting the state of sliding contact can be easily achieved.

5 Claims, 2 Drawing Sheets

CHUCK FOR MACHINE TOOL

BACKGROUND OF THE INVENTION

1. Field of the Invention

The present invention relates to a chuck for a machine tool, such as a lathe, and, more particularly, to a chuck having a chuck body and master jaws joined to the chuck body by spherical joints, i.e., the so-called swing lock chuck.

2. Description of the Related Art

A known swing lock chuck disclosed in, for example, JP-U No. 96106/1991 has main swing members (master jaws), respectively having middle spherical parts fitted in a part of a chuck body provided with spherical guide surfaces. The main swing members are supported for turning radially outward or radially inward relative to the chuck body about axis laterally extending past the centers of the spherical guide surfaces, respectively. A sliding tube (driving member) is axially slidably placed in the chuck body. A rotating member is supported for rotation by a support structure formed on the outer circumference of the sliding tube. A back end part of a main swing member is slidably inserted in an eccentric inclined hole formed in the rotating member. A recess is formed in the back end part of the main swing member. A pressing member (sliding member) is placed in the recess and is biased by a spring so as to be axially movable relative to the main swing member. The pressing member is pressed against a part of the chuck body facing the pressing member. As the sliding tube is reciprocated, the main swing member turns to open and close main clamping jaws (top jaws) supported on a front end part of the main swing member.

In this known chuck, a slight clearance is formed between the middle spherical parts of the master jaws and the spherical guide surfaces in a direction parallel to the axis of the chuck. Since the sliding member is pressed against the back end parts of the master jaws by the spring so as to be movable along the axis of the chuck, the master jaws turns radially inward and then master jaws move axially backward against the resilience of the spring when the driving member placed in the chuck body is retracted to move the master jaws radially inward. The backward movement of the master jaws does not cause any trouble at all when a workpiece is highly rigid, rather is desirable for drawing the workpiece toward a datum plane. When chucking a thin workpiece having a small dimension along the axis of the chuck, the backward movement of the master jaws bends the workpiece, which affects adversely to machining accuracy.

In such a case, the spring and the sliding member are replaced with other ones, a sliding member is attached fixedly to the back surfaces of the back end parts of the master jaws to eliminate the axial clearance between the middle spherical parts of the master jaws and the spherical guide surfaces so that the master jaws are unable to move axially and are able to move for opening and closing operations. However, the chuck must be disassembled and assembled every time the chuck is adjusted so that the master jaws may be able to move smoothly for opening and closing operations and sliding contact between the middle spherical parts and the spherical guide surfaces may not allow the backward movement of the master jaws because the sliding member is attached fixedly to the back surfaces of the back end parts of the master jaws. Thus, the known chuck requires very troublesome adjusting work.

SUMMARY OF THE INVENTION

Accordingly, it is an object of the present invention to provide a chuck including a chuck body and master jaws connected by spherical joints to the chuck body, and capable of facilitating adjusting work for adjusting the chuck so that the master jaws may not move backward along the axis of the chuck when chucking a workpiece even if a clearance is formed in the spherical joints.

According to one aspect of the present invention, a chuck comprises: a chuck body provided with a spherical guide surface; a master jaw mounted on the chuck body, the master jaw having a front end part, a back end part, and a middle spherical part extending between the front and the back end part and guided by the spherical guide surface, and the master jaw being provided with a through hole extending through the front end part, the middle spherical part and the back end part; a top jaw mounted on the front end part of the master jaw; a driving member slidably supported in the chuck body and connected by a spherical bearing member to the back end part of the master jaw to turn the master jaw on the middle spherical part engaged in the spherical guide surface when moved in the chuck body; a stopper mounted on the chuck body opposite to the back end part of the master jaw; and a sliding member inserted in the through hole of the master jaw, the sliding member having a back end part in sliding contact with the stopper so as to limit movement of the master jaw in a direction parallel to an axis of the chuck body when the mater jaw is turned.

In this chuck, it is preferable that the through hole of the master jaw has a counterbored section formed in the front end part of the master jaw and opening in a part to which the top jaw is attached, a bored section formed in the back end part of the master jaw, and an internally threaded section extending between the counterbored section and the bored section; and the movement of the sliding member fitted in the bored section is limited by a bolt having a head and screwed in the internally threaded section.

In this chuck, it is preferable that a spacer is interposed between the bottom surface of the counterbored section and the head of the bolt screwed in the internally threaded section.

In this chuck, it is preferable that the stopper is a highly abrasion-resistant member attached to the chuck body.

In this chuck, it is preferable that a surface of the back end part of the sliding member, in sliding contact with the stopper has a circular shape having its center at the center of the middle spherical part of the master jaw.

According to the present invention, the master jaw is provided with the through hole extending between the front to the back end thereof and the sliding member is inserted in the through hole of the master jaw through the front end of the through hole so as to come into sliding contact with the stopper attached to the chuck body. Therefore, the state of sliding contact between the sliding member and the stopper can be adjusted on the side of the front part of the chuck, the chuck does not need to be disassembled and assembled for the adjustment of the state of sliding contact, and work for adjusting the state of sliding contact can be easily achieved.

According to the present invention, the through hole of the master jaw has the counterbored section formed in the front end part of the master jaw and opening in the part to which the top jaw is attached, the bored section formed in the back end part of the master jaw, and the internally threaded section extending between the counterbored section and the bored section, and hence the sate of sliding contact between the sliding member and the stopper can be simply and properly adjusted by interposing a spacer having a proper thickness between the head of the bolt screwed in the internally threaded section and the bottom surface of the counterbored section.

According to the present invention, the highly abrasion-resistant member is attached to the chuck body to form the stopper, and hence the durability of the chuck can be improved.

Since the surface of the back end part of the sliding member, in sliding contact with the stopper has the circular shape having its center at the center of the middle spherical part of the master jaw, the sliding member does not obstruct the turning motion of the master jaw even though the sliding member is in sliding contact with the stopper.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A preferred embodiment of the present invention will be described with reference to the accompanying drawings.

Figure 1:
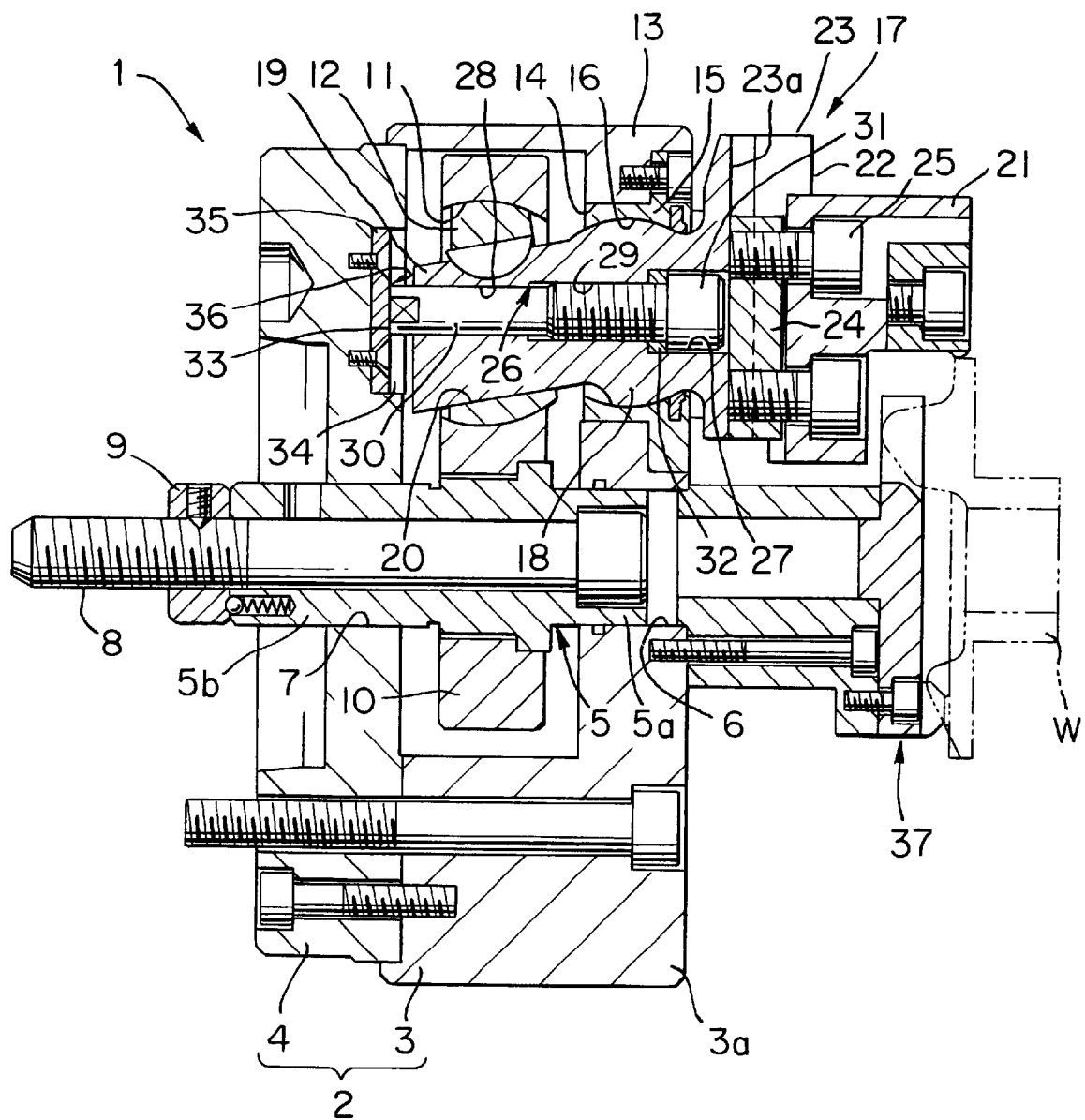
FIG. 1 is a longitudinal sectional view of a chuck in a preferred embodiment of the present invention.
Figure 2:
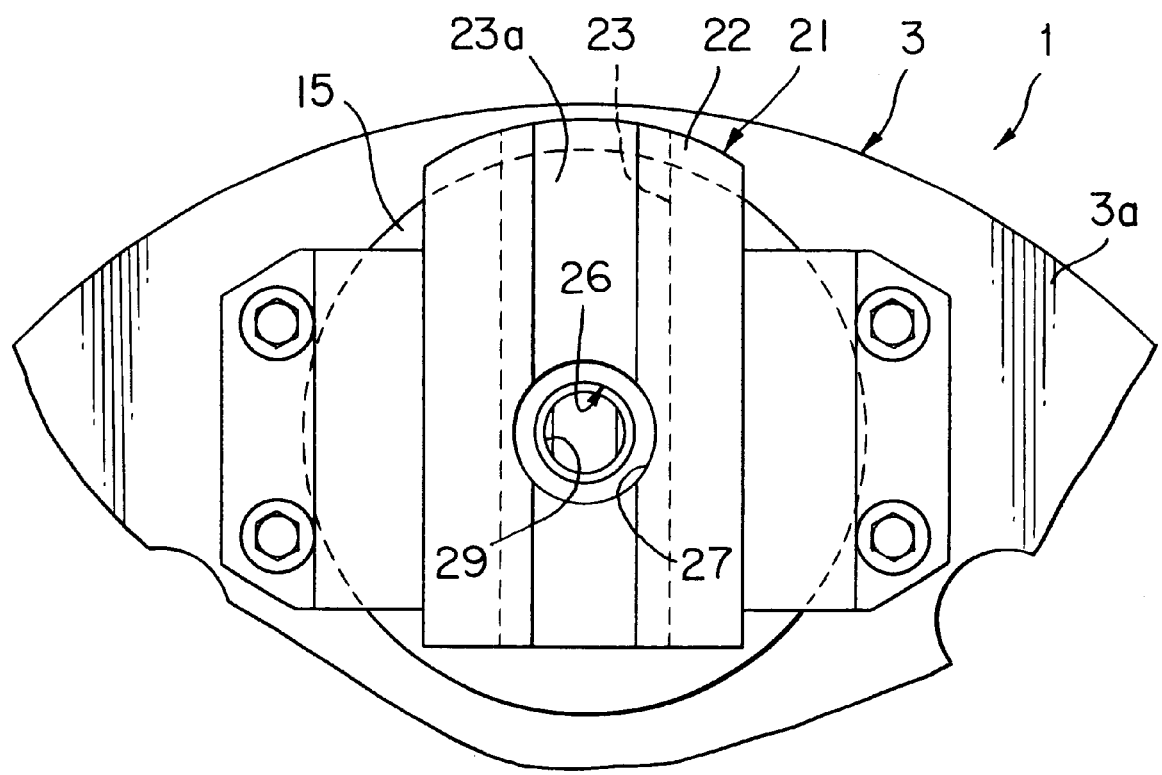
FIG. 2 is a front elevation of the chuck shown in FIG. 1 as viewed from the side of the front end parts of the master jaw included in the chuck.

Referring to FIGS. 1 and 2, a chuck 1 has a chuck body 2 having a body member 3 and a back plate 4 attached to a back end part of the body member 3. The back plate 4 is mounted on a front end part of a spindle, not shown. A driving member (plunger) 5 is inserted in the chuck body 2. A front end part 5a and a back end part 5b of the driving member 5 are fitted axially slidably in a support hole 6 formed in the body member 3 and a support hole 7 formed in the back plate 4, respectively. The support holes 6 and 7 are coaxial with the chuck 1. A central bore is formed in the driving member 5 and a draw screw 8 is inserted in the central bore. The draw screw 8 is fastened to the driving member 5 by a round nut 9. The piston rod of a rotary cylinder, not shown, is connected to the draw screw 8 to move the draw screw 8 axially. A support member 10 attached to a middle part of the driving member 5. A spherical opening 11 is formed in the support member 10 so as to correspond to a retainer 15, which will be described later. A spherical bearing member (locker ball) 12 is slidably fitted in the spherical opening 11.

The body member 3 has a front end part 13 provided with a plurality of retainer mounting holes 14 (three retainer mounting holes in this embodiment) arranged at equal angular intervals. The retainer 15 is fixedly fitted in each retainer mounting hole 14. The retainer 15 is provided with a spherical opening defined by a spherical guide surface 16. A middle spherical part 18 of each of master jaws 17 is seated slidably on the spherical guide surface 16 of each retainer 15. Each master jaw 17 has a round back end part 19. The round back end part 19 is inserted slidably in an opening 20 formed in the spherical bearing member 12 at an inclination to the axis of the chuck 1 and is keyed to the spherical bearing member 12. The master jaw 17 has a front end part provided with a jaw holding part 22 for holding a top jaw 21. The jaw holding part 22 is provided with a T-slot 23 having a T-shaped cross section. The top jaw 21 is fastened to the master jaw 17 by screwing a jaw fastening bolt 25 in a T-nut 24 fitted in the T-slot 23.

The master jaw 17 is provided with a through hole 26 extending between the front and the back end of the same.

The through hole 26 has a counterbored section 27 corresponding to the jaw holding part 22 and opening in the bottom surface 23a of the T-slot 23, a bored section 28 corresponding to the back end part of the master jaw 17 and opening toward the front end surface of the back plate 4, and an internally threaded section 29 extending between the counterbored section 27 and the bored section 28. As shown in FIG. 2, the diameter of the counterbored section 27 of the through hole 26 is greater than the width of the throat of the T-slot 23. The counterbored section 27 extends longitudinally from the front end part of the master jaw 17 through the T-slot 23. A sliding rod 30 is inserted through the counterbored section 27 in the bored section 28. A back end part of the sliding rod 30 projects from the back end surface of the master jaw 17. The position of the sliding rod 30 with respect to the direction of the axis of the chuck 1 is controlled by a bolt 31 screwed in the internally threaded section 29. A spacer 32 is interposed between the head of the bolt 31 and the bottom surface of the counterbored section 27. A circular sliding surface 33 having its center on the center of the middle spherical part 18 of the master jaw 17 is formed in the back end of the sliding rod 30.

A recess 34 is formed in a part of the back plate 4 facing the back end of the master jaw 17. A sliding plate 35 is placed in the recess 34 and is fastened to the back plate 4. The sliding plate 35 fastened to the back plate 4 serves as a stopper 36. The sliding plate 35 is a highly abrasion-resistant member. Sliding contact between the sliding rod 30 and the stopper 36 is adjusted in an optimum state of sliding contact by the spacer 32; that is, the thickness of the spacer 32 is determined so that any axial clearance may not be formed between the middle spherical part 18 of the master jaw 17 and the spherical guide surface 16 to prevent the master jaw 17 from moving in directions parallel to the axis of the chuck 1 when the master jaw 17 turns and the middle spherical part 18 of the master jaw 17 is able to slide smoothly on the spherical guide surface 16. This optimum adjustment of the state of sliding contact can be achieved by selectively determining the thickness of the spacer 32 when inserting the sliding rod 30 from the side of the front end surface 3a of the chuck 1 in the through hole 26 of the master jaw 17, inserting the bolt 31 from the side of the front surface 3a of the chuck 1 in the through hole 26 and screwing the bolt 31 in the internally threaded section 29 of the through hole 26. Thus, work necessary for repeatedly disassembling and assembling the conventional chuck provided with sliding members attached to the back end parts of the master jaws until the state of sliding contact is adjusted to an optimum state of sliding contact is not necessary. The chuck 1 of the present invention facilitates work for adjusting the state of sliding contact. In FIG. 1, indicated at 37 is a seat placed on the front end surface 3a of the body member 3 to seat a workpiece W thereon.

When the driving member 5 of the chuck 1 shown in FIGS. 1 and 2 is moved axially backward, each spherical bearing member 12 slides in the spherical opening 11 and turns about the center of the middle spherical part 18 of the associated master jaw 17 to chuck the workpiece W by the top jaws 21. Even if a clearance is formed between the middle spherical part 18 of the master jaw 17 and the associated spherical guide surface 16, the master jaw 17 is unable to move backward because the sliding rod 30 is in sliding contact with the stopper 36 and is restrained from moving backward. Thus, the workpiece W will not be drawn toward the chuck body 2 when chucking the workpiece W by the chuck 1 and hence the workpiece W will not be bent even if the workpiece W has a small thickness, i.e., a dimension along the axis of the chuck 1. Consequently, machining accuracy is not deteriorated.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A chuck comprising:

a chuck body provided with a spherical guide surface;

a master jaw mounted on the chuck body, the master jaw having a front end part, a back end part, and a middle spherical part extending between the front and the back end part and guided by the spherical guide surface, and the master jaw being provided with a through hole extending through the front end part, the middle spherical part and the back end part;

a top jaw mounted on the front end part of the master jaw;

a driving member slidably supported in the chuck body and connected by a spherical bearing member to the back end part of the master jaw to turn the master jaw on the middle spherical part engaged in the spherical guide surface when moved in the chuck body;

a stopper mounted on the chuck body opposite to the back end part of the master jaw; and a sliding member inserted in the through hole of the master jaw, the sliding member having a back end part in sliding contact with the stopper so as to limit movement of the master jaw in a direction parallel to an axis of the chuck body when the master jaw is turned.

2. The chuck according to claim 1, wherein the through hole of the master jaw has a counterbored section formed in the front end part of the master jaw and opening in a part to which the top jaw is attached, a bored section formed in the back end part of the master jaw, and an internally threaded section extending between the counterbored section and the bored section; and the movement of the sliding member fitted in the bored section is limited by a bolt having a head and screwed in the internally threaded section.

3. The chuck according to claim 2, wherein a spacer is interposed between a bottom surface of the counterbored section and the head of the bolt screwed in the internally threaded section.

4. The chuck according to claim 1, wherein the stopper is a highly abrasion-resistant member attached to the chuck body.

5. The chuck according to claim 1, wherein a surface of the back end part of the sliding member, in sliding contact with the stopper has a circular shape having its center at the center of the middle spherical part of the master jaw.

* * * * *